UNITED STATES PATENT OFFICE 2,909,528
Patented Oct. 20, 1959

2,909,528

CERTAIN N-AROYL METHYL-3-OXYPYRIDYL BETAINES AND PROCESS

Seymour L. Shapiro, Hastings on Hudson, and Louis Freedman, Mount Vernon, N.Y., and Kurt Weinberg, Hackensack, N.J., assignors to U.S. Vitamin & Pharmaceutical Corporation, a corporation of Delaware No Drawing. Application September 6, 1956
Serial No. 608,193

7 Claims. (Cl. 260—297)

This invention relates to new compounds and to a method for production thereof; more particularly, it pertains to the preparation of N-substituted-3-oxypyridyl betaines and their derivatives, and includes correlated improvements and discoveries whereby such compounds are produced with facility.

It is an object of this invention to provide a method for the synthesis of N-substituted-3-oxypyridyl betaines which may be carried out effectively, readily and economically.

A principal object of the invention is the provision of N-substituted-3-oxypyridyl betaines by reacting a 3-hydroxy pyridine with, for example, methallyl chloride in a suitable solvent, such as acetonitrile.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The compounds of this invention are represented by the following general formula:

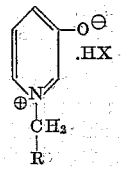

The novel compounds are readily prepared by reacting substantially equivalent quantities of a negatively substituted methylene halide with 3-hydroxypyridine according to the following equation:

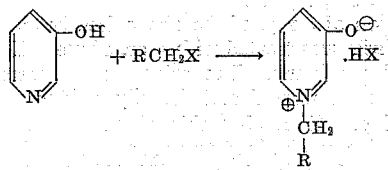

R in the foregoing formulas represent vinyl, alkyl-substituted vinyl, chloro-substituted vinyl, ethinyl, styryl, oxiranyl, carbalkoxy, carbalkoxyalkyl, carbosteroxyalkyl, oxyacylalkyl, acyl, aroyl, carbamido, carbamidoalkyl, cyanoalkyl, hydroxyalkyl, aminoalkyl, dialkylaminoalkyl, polyhalomethylalkyl, and the like. It is a limiting characteristic of the group R that this functional constituent cannot therein be halogen of the type chlorine, bromine or iodine, or a similarly readily replaceable group such as benzsulfonate, or p-toluenesulfonate and the like; for, in such instances the 3-hydroxypyridine group reacts with the other halogen or tosylate substituent to yield a bifunctional betaine, and such new betaines are disclosed in our copending application filed of even date herewith, Serial No. 608,195. Moreover the acyl groups and the alkyl groups are characterized by having a carbon content of $C_1$–$C_5$.

X is a nontoxic univalent anion, such as chlorine, bromine, iodine, benzsulfonate and p-toluenesulfonate.

We have found that under some conditions such substituents as hydroxyl and acetoxy are replaceable, and that the bifunctional betaines disclosed in our co-pending application can be obtained and can be isolated. These conditions are illustrated by the following equations:

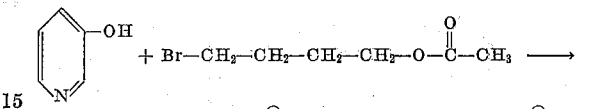

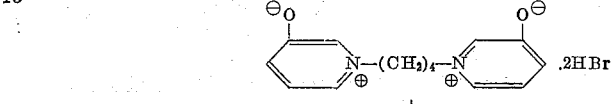

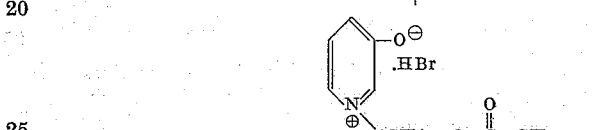

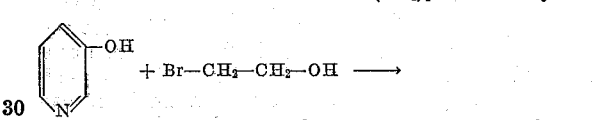

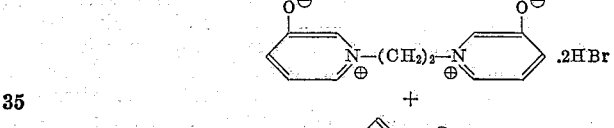

In certain instances halogen can be on the substituent chain, and the desired product can be isolated; such is the case when the halogen atom is attached to a vinyl carbon atom as in 1,2-dichloro-propene-2, and 1,3-dichlorobutene-2. We have shown that such halogen atoms are relatively non-reactive and accordingly, these atoms are retained as part of the substituent chain in the practice of this invention. The trichloromethyl group, when part of a functional reactant as 1,1,1,5-tetrachloropentane, is likewise retained.

We have found that the effect of the negative group on the reaction is not limited by the requirement that it be closely attached to the reactant methylene halide group. This result is all the more surprising as this effect appears, within wide limits, to be independent of the position of the negative group in the chain. Ordinarily, the influence of one group on a reaction does not extend very far along the hydrocarbon chain, but in the case of the reaction of the present invention, this influence takes place even when the negative group is very far removed which is an unusual and surprising departure from the ordinary course of organic reactions. The reason for this unusual behavior of the reaction has not been fully determined, and it will be understood that the present invention is not limited by any theory of action.

That the compounds of this invention are betaines involving the 3-oxy function and the nitrogen of the pyridine ring, is evidenced by the following chemical properties—yield orange-brown color with ferric chloride solution; aqueous solution of the acid addition salts liberate carbon dioxide on treatment with sodium bicarbonate solutions; the free betaine is precipitated from aqueous solutions of the betaine acid addition salt solutions by treatment with concentrated alkali; the free betaine so obtained is somewhat water-soluble, its aqueous solution is substantially neutral, gives a brown-orange color with ferric chloride solution, and can be reverted to the acid addition salt by neutralization with acid; on treatment with phenylisocyanate or acetic anhydride the free betaines are recovered unchanged; on treatment of the free betaines with alkyl halides the alkoxy-quaternary compounds are formed, and these simple derivatives are to be considered within the purview of this invention.

The following equation illustrates the latter reaction:

wherein R and X have the same meaning as above, and R" is a member of the group consisting of an alkyl group, e.g., methyl, ethyl, propyl and butyl, benzyl, and the like.

In the practice of the invention, the new betaines are prepared by reacting, preferably in a solvent, substantially equivalent quantities of a 3-hydroxypyridine with a molar equivalent quantity of a compound which may be represented by R'—CH$_2$—X, wherein R' has the significance described above, and X is one of a group consisting of chlorine, bromine, iodine, benzsulfonate, p-toluenesulfonate and the like. The solvent employed can be varied, thus use may be made of alcohol such as methanol, ethanol, propanol, isopropanol, butanol; other polar solvents such as acetonitrile; non-polar solvents such as toluene, xylene, and inert solvents which do not react with the reagents and afford some degree of solubility for the reagents. Suitable solvents are the propanols and acetonitrile in that reaction and product isolation conditions are simple with the reaction proceeding rapidly at the reflux temperatures of these solvents. The reaction temperature conditions may range from room temperature, i.e., about 20° C., to about 150° C., depending on the solvent. In many instances immediate exothermic reactions are observed.

As an illustrative embodiment of a manner in which the invention may be practiced the following examples are presented.

EXAMPLE 1

*N-methallyl-3-oxypyridyl betaine hydrochloride*

A solution of 9.5 g. of 3-hydroxypyridine and 9.05 g. of methallyl chloride in 50 cc. of acetonitrile was refluxed for 8 hours. The cooled reaction mixture, to a temperature of 20° C., on standing 20 hours deposited a product which was separated by filtration. Concentration of the filtrate afforded additional product. These products were combined and recrystallized from ethanol-ethyl acetate.

*Analysis.*—Calculated: C, 58.2; H, 6.5; N, 7.5. Found: C, 58.1; H, 6.5; N, 7.8.

EXAMPLE 2

*N-cinnamyl-3-oxypyridyl betaine hydrochloride*

A solution of 9.5 g. of 3-hydroxypyridine and 15.2 g. of cinnamyl chloride in 50 cc. of acetonitrile was refluxed for 5 hours. The cooled reaction mixture on standing 20 hours deposited a crystalline product which was recrystallized from acetonitrile.

*Analysis.*—Calculated: C, 67.9; H, 5.7; N, 5.7. Found: C, 68.0; H, 5.7; N, 5.6.

EXAMPLE 3

*N-[3-chlorocrotyl]-3-oxypyridyl betaine hydrochloride*

A solution of 9.5 g. of 3-hydroxypyridine and 6.25 g. of 1,3-dichloro-butene-2 in 50 cc. of n-propanol was refluxed for 20 hours. The propanol was removed under vacuo, 15 mm. Hg, and the oily residue treated with 12 cc. of propanol followed by 120 cc. of ether. After standing 2 hours the formed crystals were separated by filtration and recrystallized from methanol-ethyl acetate.

*Analysis.*—Calculated: C, 49.1; H, 5.0; N, 6.4; Cl, 32.3. Found: C, 49.1; H, 4.8; N, 6.2; Cl, 32.4.

EXAMPLE 4

*N-[5,5,5-trichloropentyl] - 3 - oxypyridyl betaine hydrochloride*

A solution of 9.5 g. of 3-hydroxypyridine and 20.8 g. of 1,1,1,5-tetrachloropentane in 50 cc. of methyl-Cellosolve was refluxed for 9 hours. The solvent was removed in vacuo, 15 mm. Hg. The formed crystals were separated by filtration, and recrystallized from acetonitrile-methanol.

*Analysis.*—Calculated: C, 39.3; H, 4.3; N, 4.6; Cl, 46.6. Found: C, 39.5; H, 4.2; N, 5.0; Cl, 46.2.

EXAMPLE 5

*N-[p-chlorobenzyl]-3-oxypyridyl betaine hydrochloride*

A solution of 9.5 g. of 3-hydroxypyridine and 16.1 g. of p-chlorobenzyl-chloride in 50 cc. of propanol was refluxed for 24 hours. The solvent was removed and the formed crystals separated by filtration and recrystallized from ethanol-ethyl acetate.

*Analysis.*—Calculated: C, 56.3; H, 4.3; N, 5.5. Found: C, 56.1; H, 4.7; N, 5.5.

A solution of 12.8 g. of the above product in 20 cc. of water was treated with a solution 7 g. of NaOH in 25 cc. of water. After scratching and cooling, crystals precipitated and were separated, dried and recrystallized from ethyl-acetate-ethanol. The free betaine so obtained is somewhat hygroscopic and holds water tenaciously.

*Analysis.*—Calculated: C, 60.6; H, 5.1; N, 5.9. Found: C, 61.0; H, 5.0; N, 6.1.

A solution of 0.5 g. of the above free betaine in 6 cc. of acetonitrile was treated with 4 cc. of methyliodide and refluxed for 4 hours. The solvent and excess methyliodide were evaporated and the oily residue crystallized on standing. The N-(p-chlorobenzyl)-3-methoxypyridinium iodide so obtained was recrystallized from water.

*Analysis.*—Calculated for $C_{13}H_{13}NOClI$: C, 43.2; H, 3.6; N, 3.9. Found: C, 42.9; H, 3.5; N, 4.3.

EXAMPLE 6

*N-[oxiranylmethyl]-3-oxypyridyl betaine hydrochloride*

A solution of 9.5 g. of 3-hydroxypyridine and 9.25 g. of epichlorohydrin in 50 cc. of tertiary amyl alcohol was allowed to stand at 25° C. for 72 hours. The formed crystals were separated by filtration and recrystallized from methanol-ethylacetate.

*Analysis.*—Calculated: C, 51.2; H, 5.3; N, 7.5; Cl, 18.9. Found: C, 50.8; H, 5.4; N, 7.2; Cl, 18.6.

EXAMPLE 7

N-(2-hydroxyethyl)-3-oxypyridyl betaine hydrochloride

A solution of 9.5 g. of 3-hydroxypyridine and 8.05 g. of ethylene chlorohydrin in 60 cc. of propanol was refluxed for 24 hours. After removal of 15 cc. of propanol in vacuo, 15 mm. Hg, the product crystallized out; was separated by filtration, and recrystallized from ethanol-heptane.

*Analysis.*—Calculated: C, 47.9; H, 5.7; N, 8.0. Found: C, 47.9; H, 5.7; N, 7.7.

In a similar manner the hydrobromide was obtained using ethylene bromohydrin as the reactant.

*Analysis.*—Calculated: C, 38.2; H, 4.5; N, 6.4. Found: C, 38.2; H, 4.7; N, 6.4.

The free betaine of this product was prepared.

EXAMPLE 8

N-(4-acetoxybutyl)-3-oxypyridyl betaine hydrobromide

A solution of 9.5 g. of 3-hydroxypyridine and 19.3 g. of 4-bromo-n-butylacetate in 50 cc. of acetonitrile was refluxed for 8 hours. The cooled reaction mixture after standing for 20 hours deposited crystals which were separated by filtration and shown to be N,N'-tetramethylene-bis-[3-oxypyridyl] betaine dihydrobromide disclosed in our co-pending application filed of even date herewith, Serial No. 608,195. The filtrate was evaporated to dryness in vacuo, 15 mm. Hg, and the residue so obtained triturated with ethylacetate. The product so obtained was recrystallized from ethanol-ethylacetate.

*Analysis.*—Calculated: C, 45.5; H, 5.5. Found: C, 45.8; H, 5.5.

EXAMPLE 9

N-[2-(carbo-[3-cholesteryloxy])ethyl]-3-oxypyridyl betaine hydrobromide

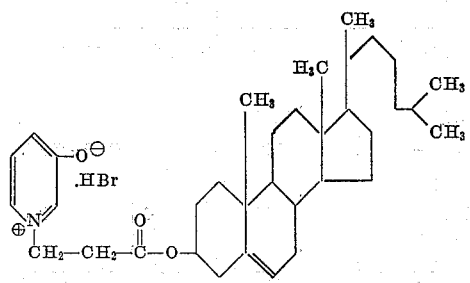

The required cholesterol β-bromopropionate was prepared by adding dropwise with stirring, 5 g. of cholesterol in 150 cc. of toluene and 10 cc. of pyridine to a cooled (−10° C.) solution of 9 cc. of β-bromopropionyl chloride in 120 cc. of toluene. After addition had been completed, stirring was continued for 20 hours at room temperature. Water, 100 cc., was added; shaken with the reaction mixture; the toluene layer separated, and successively washed with dilute hydrochloric acid, water, dilute sodium bicarbonate and water. Then the toluene layer was dried over anhydrous magnesium sulfate; filtered; the toluene removed in vacuo, 15 mm. Hg, and the residue β-bromopropionate of cholesterol recrystallized from ethanol.

*Analysis.*—Calculated for $C_{30}H_{49}O_2Br$: C, 69.1; H, 9.4. Found: C, 69.0; H, 8.9.

A solution of 5.21 g. of the β-bromopropionate of cholesterol and 0.95 g. of 3-hydroxypyridine in 15 cc. of benzene plus 5 cc. of acetonitrile was refluxed for 5 hours. After cooling the formed crystals were separated by filtration and recrystallized from acetonitrile.

*Analysis.*—Calculated: C, 68.2; H, 8.8; N, 2.3. Found: C, 68.9; H, 8.9; N, 2.3.

EXAMPLE 10

N-[carbopropoxymethyl]-3-oxypyridyl betaine hydrochloride

A solution of 9.5 g. of 3-hydroxypyridine and 12.2 g. of ethylchloroacetate in 60 cc. of propanol was refluxed for 24 hours. After cooling, 25 cc. of propanol were removed in vacuo, 15 mm. Hg, whereupon the product crystallized. The formed crystals were separated by filtration and recrystallized from ethanol-heptane. It may be noted that, while the initial reactant was an ethylester, during the reaction in the propanol medium cross-esterification occurred and the product evidenced the presence of the propoxy group.

*Analysis.*—Calculated: C, 51.8; H, 6.0; N, 6.0. Found: C, 51.3; H, 6.3; N, 5.7.

The free base was prepared by dissolving 2.17 g. of the above product in 15 cc. of propanol and adding a solution of 0.23 g. of sodium in 25 cc. of propanol. The formed sodium chloride was filtered and the filtrate evaporated to dryness. The residue obtained was crystalline, somewhat hygroscopic, and was recrystallized from ethylacetate.

*Analysis.*—Calculated: C, 56.3; H, 7.1; N, 6.6. Found: C, 56.0; H, 7.1; N, 6.3.

EXAMPLE 11

N-acetonyl-3-oxypyridyl betaine hydrochloride

A solution of 9.5 g. of 3-hydroxypyridine and 9.25 g. of chloracetone in 50 cc. of propanol was refluxed for 2 hours. After standing 20 hours, the propanol was removed in vacuo, 15 mm. Hg, and the residue crystallized. The crystalline mat was triturated with acetonitrile; separated by filtration, and the product was recrystallized from ethanol-ethylacetate.

*Analysis.*—Calculated: C, 51.2; H, 5.3; N, 7.5. Found: C, 51.3; H, 5.2; N, 7.7.

EXAMPLE 12

N-(p-bromophenacyl)-3-oxypyridyl betaine hydrobromide

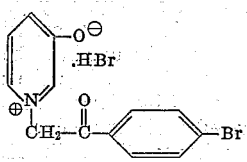

A solution of 10.1 g. of a,p-dibromoacetophenone in 35 cc. of acetonitrile was prepared, and to this solution at 60° C. was added a solution of 3.46 g. of 3-hydroxypyridine in acetonitrile. After 5 minutes, crystals of the product formed, and after standing 20 hours the formed crystals were separated by filtration and recrystallized from methanol.

*Analysis.*—Calculated: C, 41.8; H, 3.0; N, 3.8. Found: C, 42.2; H, 2.8; N, 3.7.

EXAMPLE 13

N-[(N-p-chlorophenyl)carbamidomethyl]-3-oxypyridyl betaine hydrochloride

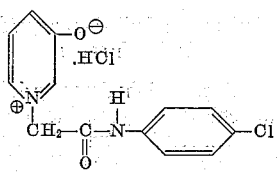

A solution of 2.0 g. of 3-hydroxypyridine and 4.0 g. of a,p-dichloroacetanilide (prepared from chloroacetyl chloride and p-chloroaniline) in 50 cc. of ethanol was refluxed for 5 hours. The product in the form of crystals was filtered off. The filtrate was refluxed an additional 5 hours, and additional product obtained, which was recrystallized from aqueous hydrochloric acid.

*Analysis.*—Calculated: C, 52.2; H, 4.1; N, 9.4. Found: C, 52.4; H, 4.1; N, 9.3.

The free betaine was obtained by dissolving 1 g. of above product in 20 cc. of water and adding an excess of sodium bicarbonate. An additional 30 cc. of water were added and the free betaine crystallized on standing at 5° C.

*Analysis.*—Calculated N, 10.7. Found N, 10.6.

The benzyloxy quaternary ammonium salt was prepared by refluxing a solution of 0.5 g. of above betaine in 30 cc. of propanol with 0.65 g. of benzyl bromide for 20 hours. N - [(N - p - chlorophenyl)carbamidomethyl] - 3 - benzyloxy-pyridinium bromide was thus obtained upon cooling.

*Analysis.*—Calculated for $C_{20}H_{18}N_2O_2BrCl$: N, 6.5. Found: N, 6.1.

The methoxy quaternary ammonium salt was prepared by refluxing a solution of 1 g. of the above betaine in 60 cc. of ethanol and 2 cc. of methyl iodide for 20 hours. Cooling and dilution with 60 cc. of acetone yielded crystals of N-[(N-p-chlorophenyl)carbamidomethyl]-3-methoxy-pyridinium iodide, which were separated by filtration.

*Analysis.*—Calculated for $C_{14}H_{14}N_2O_2ClI$: C, 41.5; H, 3.5; N, 6.9. Found: C, 42.1; H, 3.4; N, 7.4.

This compound is represented by the formula:

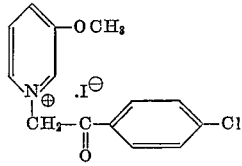

EXAMPLE 14

*N-(4-cyanobutyl)-3-oxypyridyl betaine hydrobromide*

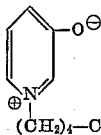

A solution of 9.5 g. of 3-hydroxypyridine and 16.2 g. of 1-bromo-4-cyanobutane in 50 cc. of acetonitrile was refluxed for 8 hours. On cooling, the solvent was removed under vacuo, 15 mm. Hg; the residue triturated with acetone; separated by filtration, and the product recrystallized from ethanolethylacetate.

*Analysis.*—Calculated: C, 46.7; H, 5.1; N, 10.9. Found: C, 46.9; H, 4.9; N, 10.9.

EXAMPLE 15

*N-(2-aminoethyl)-3-oxypyridyl betaine dihydrobromide*

A solution of 4.75 g. of 3-hydroxypyridine and 10.25 g. of bromoethylamine hydrobromide in 50 cc. of propanol was refluxed for 2 hours. On cooling the product crystallized; was separated by filtration, and recrystallized from methanolethylacetate.

*Analysis.*—Calculated: N, 9.3; Br, 53.3. Found: N, 9.4; Br, 51.3.

EXAMPLE 16

*N-(2-dimethylaminoethyl)-3-oxypyridyl betaine dihydrochloride*

A solution of 9.5 g. of 3-hydroxypyridine and 14.3 g. of dimethylaminochloride hydrochloride in 60 cc. of propanol was refluxed for 5 hours. On cooling the product crystallized; was separated by filtration, and recrystallized from methanolethylacetate.

*Analysis.*—Calculated: C, 45.2; H, 6.7; N, 11.7. Found: C, 45.1; H, 6.6; N, 11.9.

The bis-quarternary ammonium derivative of the above alkoxylated pyridine was obtained as follows. To a solution of 0.46 g. of sodium in 55 cc. of propanol was added 2.38 g. of the above product, and the formed sodium chloride filtered off. The filtrate was treated with 15 cc. of methyl iodide, and the reaction mixture refluxed for 5 hours. The cooled reaction mixture on standing 60 hours deposited crystals, which were recrystallized from methanol-ethylacetate. The N - (2 - trimethylammonioethyl)-3-methoxypyridinium di-iodide so produced has the structure

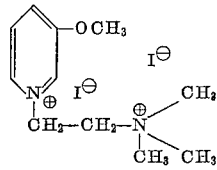

*Analysis.*—Calculated for $C_{11}H_{20}N_2OI_2$: C, 29.3; H, 4.4. Found: C, 29.3; H, 4.5.

EXAMPLE 17

*N-(3-dimethylaminopropyl)-3-oxypyridyl betaine dihydrochloride*

A solution of 9.5 g. of 3-hydroxypyridine and 16.7 g. of 3-dimethylaminopropylchloride hydrochloride in 50 cc. of acetonitrile was refluxed for 8 hours. On cooling a crystalline product was obtained, which was separated by filtration and recrystallized from methanol-ethylacetate.

*Analysis.*—Calculated: C, 47.4; H, 7.1; N, 11.1. Found: C, 47.2; H, 7.0; N, 11.0.

Representative compounds of those herein disclosed are presented in Table I and their preparation is described in the preceding examples.

TABLE I

| R | HX | M.P., °C. | Formula |
|---|---|---|---|
| —CH=CH₂ | HBr | 97–9 | $C_8H_{10}NOBr$ |
| —C(CH₃)=CH₂ | HCl | 139–44 | $C_9H_{12}NOCl$ |
| —CH=CH—ph | HCl | 137–40 | $C_{14}H_{14}NOCl$ |
| —C(Cl)=CH₂ | HCl | 153–5 | $C_8H_9NOCl_2$ |
| —C(H)=C(Cl)—CH₃ | HCl | 181–2 | $C_9H_{11}NOCl_2$ |
| —(CH₂)₃—C(Cl)(Cl)—Cl | HCl | 175–6 | $C_{10}H_{13}NOCl_4$ |
| —ph | HBr | 125–8 | $C_{12}H_{12}NOBr$ |
| —ph | ——— | 107–10 | $C_{12}H_{11}NO.H_2O$ |
| —ph—p—Cl | HCl | 184–5 | $C_{12}H_{11}NOCl_2$ |
| —ph—p—Cl | ——— | 133–5 | $C_{12}H_{10}NOCl.H_2O$ |
| —CH(—O—CH₂) (epoxide) | HCl | 133–5 | $C_8H_{10}NO_2Cl$ |
| —CH₂—OH | HCl | 139–44 | $C_7H_{10}NO_2Cl$ |
| —CH₂—OH | HBr | 122–4 | $C_7H_{10}NO_2Br$ |
| —CH₂—OH | ——— | 158–9 | $C_7H_9NO_2$ |
| —CH₂—O—CH(ph)(ph) | HBr | 115–43 | $C_{20}H_{28}NO_2Br$ |
| —(CH₂)₃—O—C(=O)—CH₃ | HBr | 94–6 | $C_{11}H_{16}NO_3Br$ |
| —C(=O)—O—C₃H₇ | HCl | 156–8 | $C_{10}H_{14}NO_3Cl$ |

TABLE I.—Continued

| R | HX' | M.P., °C. | Formula |
|---|---|---|---|
| —C(=O)—O—C₃H₇ | | 74–8 | $C_{10}H_{13}NO_3 \cdot \frac{1}{2}H_2O$ |
| —CH₂—C(=O)—O—Test[a] | HBr | 202–4 | $C_{27}H_{38}NO_4Br$ |
| —CH₂—C(=O)—O—Chol[b] | HBr | 178–210 | $C_{35}H_{54}O_3NBr$ |
| —C(=O)—CH₃ | HCl | 134–6 | $C_8H_{10}NO_2Cl$ |
| —C(=O)—ph | HCl | 205–7 | $C_{13}H_{12}NO_2Cl$ |
| —C(=O)—ph—3,4—di—OCH₃ | HCl | 226–7 | $C_{15}H_{16}NO_4Cl \cdot \frac{1}{2}H_2O$ |
| —C(=O)—ph—p—N(H)—C(=O)—CH₃ | HCl | 249–52 | $C_{15}H_{15}N_2O_3Cl$ |
| —C(=O)—ph—2,4—di—CH₃ | HCl | 250–2 | $C_{15}H_{16}NO_2Cl$ |
| —C(=O)—ph—p—NO₂ | HBr | 235–7 | $C_{13}H_{11}N_2O_4Br$ |
| —C(=O)—ph—p—Cl | HBr | 231–3 | $C_{13}H_{11}NO_2ClBr$ |
| —C(=O)—ph—p—Br | HBr | 255–7 | $C_{13}H_{11}N_2O_2Br_2$ |
| —C(=O)—ph—p—ph | HBr | 235–7 | $C_{19}H_{16}NO_2Br$ |
| —C(=O)—ph—p—ph | HCl | 253–4 | $C_{19}H_{16}NO_2Cl$ |
| —C(=O)—N(H)—ph | HCl | 205–10 | $C_{13}H_{13}N_2O_2Cl$ |
| —C(=O)—N(H)—ph—p—Cl | HCl | 205 | $C_{13}H_{12}N_2O_2Cl$ |
| —C(=O)—N(H)—ph—p—Cl | | 265–7 | $C_{13}H_{11}N_2O_2Cl$ |
| —C(=O)—N(H)—CH₂—ph | HCl | 153–5 | $C_{14}H_{15}N_2O_2Cl$ |
| —(CH₂)₃—CN | HBr | 91–4 | $C_{10}H_{13}N_2OBr$ |
| —(CH₂)₄—CN | HCl | 119–21 | $C_{11}H_{15}N_2OCl$ |
| —CH₂—NH₂ | Hbr [c] | 218–22 | $C_7H_{12}N_2OBr_2$ |
| —CH₂—N—(CH₃)₂ | HCl [c] | 237–40 | $C_9H_{16}N_2OCl_2$ |
| —CH₂—N—(C₂H₅)₂ | HCl [c] | 154–62 | $C_{11}H_{20}N_2OCl_2$ |
| —CH₂—CH₂—N—(CH₃)₂ | HCl [c] | 227–33 | $C_{10}H_{18}N_2OCl_2$ | ph=phenyl (C₆H₅).
[a] 17-testosteryl.
[b] 3-cholesteryl.
[c] 2HX.

The novel compounds render economically available a wide spectrum of new chemicals for further synthetic work. For example, by reduction a wide variety of 3-hydroxypiperidines is obtainable and such reduction procedures are disclosed in our co-pending application filed of even date herewith, Serial No. 608,194. Further, the compounds of this invention show a low order of toxicity and manifest a variety of desirable pharmacological properties such as adrenergic blocking activity, and, hypoglycemic activity.

The new betaines herein described may conveniently be used in the form of water-soluble, non-toxic acid addition salts or quaternary alkoxylated ammonium salts, and these salts are within the purview of this invention. The acids which can be used to prepare acid addition salts are those which produce salts whose anions are relatively innocuous in therapeutic doses of the salts so that the beneficial physiological properties inherent in the betaines are not vitiated by side effects ascribable to the anions. Appropriate acid addition salts are those obtained by reaction with mineral acids, e.g., hydrochloric, hydrobromic, hydriodic, sulfuric and phosphoric acids, and organic acids such as p-toluenesulfonic, citric and tartaric acids, and the like. Moreover, N-substituted-3-alkoxypyridinium quaternary ammonium compounds are obtained by addition of alkyl or arylalkyl esters of inorganic acids, or organic sulfonic acids including such compounds as methyliodide, methyl-p-toluenesulfonate, benzylbromide, ethylbromide and methylsulfate, and the like, to the free betaine form of the compounds.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described out invention, what we claim as new and desire to secure by Letters Patent is:

1. The betaine of the formula

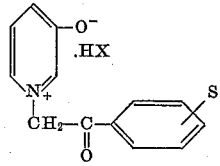

in which S is selected from the group consisting of hydrogen, halogen, lower alkyl, lower alkoxy, said lower alkyl and lower alkoxy having a carbon content $C_1$–$C_2$; nitro, acetamido and phenyl and X is selected from the group consisting of chlorine and bromine.

2. The compound

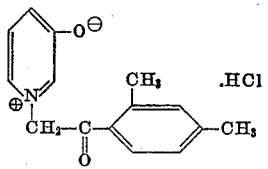

3. The compound

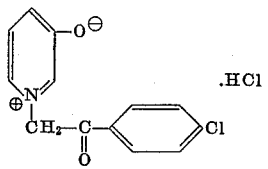

4. The compound

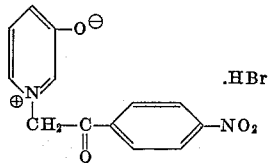

5. The compound

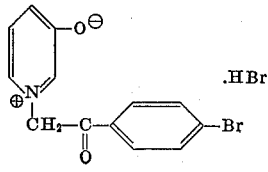

6. The compound

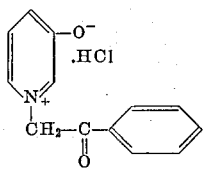

7. A method for the preparation of the betaine as defined in claim 1 which comprises reacting a compound of the formula

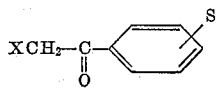

with 3-hydroxypyridine in an inert solvent and separating the reaction product, in which said compound, and reaction product S and X have the same significance as claim 1.

References Cited in the file of this patent

UNITED STATES PATENTS 2,728,775     Clauson-Kaas _____ Dec. 27, 1955

OTHER REFERENCES

Wuest et al.: J. Am. Chem. Soc., vol. 73, pp. 1210–16 (1951).